UNITED STATES PATENT OFFICE.

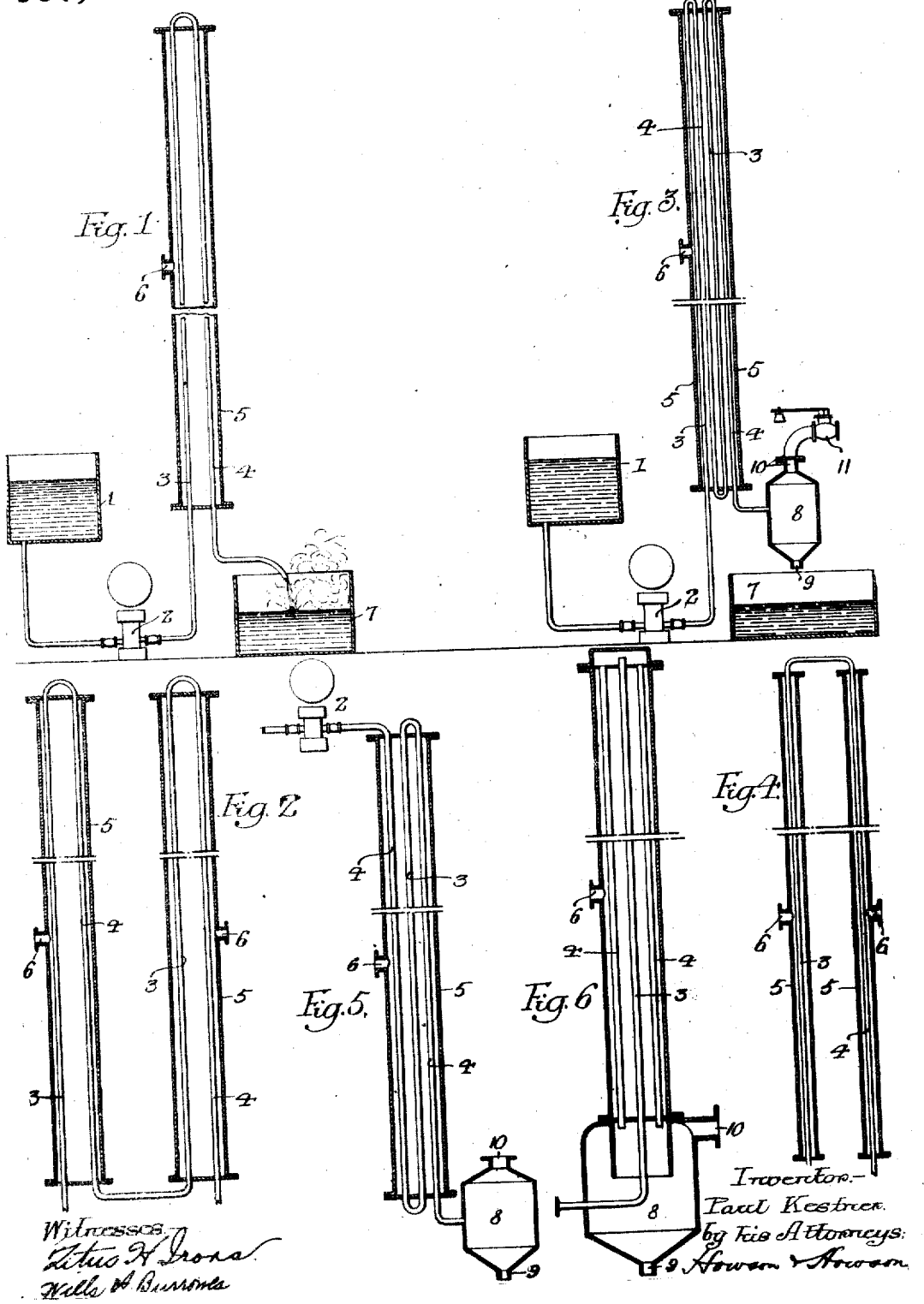

PAUL KESTNER, OF LILLE, FRANCE.

PROCESS OF EVAPORATING LIQUIDS.

997,503.

Specification of Letters Patent.  Patented July 11, 1911.

Application filed June 20, 1910.  Serial No. 567,956.

*To all whom it may concern:*

Be it known that I, PAUL KESTNER, a citizen of the Republic of France, and a resident of Lille, Department Nord, France, have invented an Improved Process of Evaporating Liquids, of which the following is a specification.

My invention relates to high density concentration and substantial desiccation of extracts such as extracts of wood, logwood, quebracho, chestnut and many other vegetable and organic matters, and it comprises a method of evaporating viscous liquids containing sensitive colloid matters wherein such liquids are formed into a positively propelled film carried forward under the influence of an onrushing vapor current of relatively high speed; said film being heated for a very short period of time to a temperature above the normal boiling point of water, and the heating being continued until the material under treatment has lost sufficient water by evaporation to become solid on exposure to atmospheric temperature and pressure; the final stages of the travel of said film being in a substantially vertical downward direction; all as more fully hereinafter set forth and as claimed.

To attain economy in the expense of carriage and packing of extracts and many viscous liquids, it has long been endeavored to carry concentration of the same to dryness or substantially complete desiccation, or at least to a pasty or solid state approaching dryness. More or less success has been achieved with some of these extracts by making the concentration under a reduced vacuum or under atmospheric pressure with steam coils or steam belts. This operation, however, is very long and difficult; it is necessary to use steam at high pressure in the coil or steam belt, and the quality of the extract is often injured during the period of evaporation. Up to the present time, it has generally been understood that extracts are altered at high temperatures. While I have found this to be generally true in apparatus used up to the present time, the liability to change is due rather to the length of time of evaporation and the manner in which evaporation is conducted, rather than to the high temperature involved. In a way it may be said that in completing the evaporation or desiccation of these materials, time and temperature are reciprocal factors; a long exposure at a low temperature may be, and frequently is, as injurious as a shorter exposure to a high temperature. And, within due limits, the sheer degree of temperature used is not as important as the time of exposure thereto. If the time of exposure thereto be sufficiently brief relatively very high temperatures may be safely used and with advantage. By a suitable correlation of time and temperature, the temperature may be raised to a point where all, or substantially all, the moisture is removed before the material has time to suffer any damage. By using the process which I have developed, evaporation to dryness may be obtained without any alteration, notwithstanding the fact that during the process of concentration the material under treatment has been temporarily subjected to temperatures above 100° C.

To put in practice my improved process in the embodiment of the present case, I preferably commence with the liquid extract already concentrated to a relatively high density in any ordinary apparatus. This material is fed to elongated evaporating tubes disposed vertically, and such apparatus should consist of at least two tubes having their upper ends connected so as to secure a complete and rapid circulation of the material fed to the lower end of one of said tubes, up therethrough and down through the next tube.

In the accompanying illustration I have shown more or less diagrammatically certain organizations of apparatus elements capable of use in the described process.

In this showing: Figure 1, is a simple form of apparatus in which my improved process may be carried out; Fig. 2, is a view illustrating another form of apparatus in which the described process may be carried out; a plurality of casings each with a pair of circulating tubes being employed; Fig. 3, is a view illustrating another form of apparatus capable of carrying out my improved process having a plurality of circulating tubes within a single casing, with a desiccating chamber connected to the end of the discharging tube; Fig. 4, is a view illustrating still another form of apparatus which may be employed, comprising a plurality of casings, one carrying an ascending tube, and the other a descending tube; Fig. 5, is a modified form of apparatus available for use in carrying out my improved process, in which the material is fed at the upper portion of the structure, such apparatus being also provided with a desiccating chamber, and Fig. 6, is another modified form of structure, also available for the process, having a separating chamber at the base communicating with the downwardly discharging tubes.

In the drawings herewith, 1 represents a reservoir containing material to be concentrated; 2 a pump for delivering the material to the apparatus in a continuous manner against the pressure therein; 3 a substantially vertical tube or tubes in which the material ascends; 4 a substantially vertical tube or tubes in which it descends; 5 a shell inclosing the tubes and receiving the heating medium which may enter at the point 6, and 7 is a reservoir into which the concentrated material may be discharged.

As here shown, 7 indicates a simple open tank. As the finished material leaves the descending tube or tubes, the accompanying water vapor goes off into the air while the desiccated but hot and still fluid material falls into the tank where it soon becomes solid on cooling. It still carries some moisture, and must have at the point of discharge sufficient to enable it to be fluid at such point but this amount is not, in the preferred form of this invention, sufficient to enable it to remain fluid at ordinary temperatures so that upon cooling it sets and solidifies. In another modification of this invention, in lieu of discharging the material at atmospheric pressure, I may discharge it into a vacuum tank where the remaining moisture will also flash into vapor, vesiculating the mass and rendering it light and fluffy, but this I do not specifically claim herein, it forming the specific subject matter of my copending application, Serial No. 490,804. Instead of discharging the concentrated material into said open reservoir, however, I may discharge it into a separating chamber 8, as illustrated in Fig. 2, from which the concentrated liquid may escape by a pipe 9 to a suitable receptacle; which may be the open tank 7. The vapor may pass off at 10, preferably through a back pressure valve, indicated at 11, in order to produce a suitable back pressure to permit an elevation of temperature desirable for certain extracts very difficult to dehydrate and which have a high boiling point. The separated vapor may be led to any desired point of use.

It will be understood that if liquid previously heated be delivered regularly and continuously to the lower end of an ascending tube or tubes 3; a heating medium being simultaneously admitted, preferably under pressure, to the shell, vapor will be produced in such liquid as soon as it reaches the portion of the tube within the shell, and with this vapor will drive forward the accompanying liquid in the manner of the climbing film type of evaporators; that is to say, that in proportion as the liquid advances in a tube, the flow of vapor increases, and consequently its velocity. When a certain velocity of the vapor current is reached, the liquid is entrained and carried forward as a thin film on the inner surface of the tube. Arriving at the top of the apparatus, the vapor and the liquor entrained by the vapor, pass into the second tube; the liquid in a thin traveling film passing over the length of the surface, and the current of vapor occupying the central space. It will be readily understood, therefore, that the slower the material is fed into the apparatus, the thinner will be the traveling film and the greater will be the extraction of the watery content and the greater will be the concentration of the material discharged. By giving the tubes the proper correlation of length and diameter, it is easy and possible to dry most extracts to such an extent that on cooling they will become absolutely solid and brittle without the necessity of subjecting them to further desiccation by the action of a drier. Extracts flow with great difficulty at the consistency at which they leave the ordinary forms of concentrating apparatus, and it is for this reason that their further concentration in such ordinary apparatus is substantially impossible.

In the apparatus which I have shown and described it will be seen that it is in the descending tube that final concentration is effected, it being easier to make stiff liquids flow downward. The extract being carried downward by the vapor which passes through the tube with great velocity, the material is forced to descend even if very viscous.

It is important in operating the process that the tubes be in a vertical or approximately vertical position, since a non-vertical position leads to irregularities in the distribution of the filmiform liquid in the ascending tubes, and of the thin falling film in the descending tubes. It is also important that the length of the tube be considerable, or, rather, that the ratio between the length of the tubes and their diameter be such as to insure the desired velocity in the travel of the vapor and liquid under treatment. It is by correlating these conditions that I am able to obtain the velocity of vapor necessary to distribute the extract in a thin film on the inner surface of the tubes, and to cause the duration of the passage through the apparatus to be so brief that I am able to avoid any substantial alteration in the product.

Fig. 2 represents another variation and shows an apparatus carrying four tubes in which the first pair of tubes are in a different heating shell than the last pair. For certain cases where it may be desirable, this arrangement permits of heating the two shells differently.

The apparatus shown in Fig. 3, is a variation of that shown in Fig. 1, in which four tubes are employed instead of three. This arrangement is recommended for particularly difficult concentrations and where economy in height is desirable, since the four tubes three meters in length will serve the same purpose as two tubes six meters in length. In the same way, it is possible to have a greater number of communicating tubes, six for example. In this form of the apparatus the liquid passes to a special separating chamber instead of being directly discharged into a receptacle open to the atmosphere.

In Fig. 4, a variation is represented in which each tube has its separate heating shell permitting independent heating.

Fig. 5 represents an apparatus containing three tubes in which the point of feed of material to be treated is at the upper end of one of said tubes.

In Fig. 6, another form of apparatus having three tubes is shown; the material to be treated being fed to the lower end of an ascending tube and descending in a plurality of tubes.

It will be understood that any degree of pressure above or below atmospheric may be maintained in the receptacles, but if there is any degree of vacuum therein and the material is so passed through the apparatus as to finish with moisture capable of self-evaporation at the finishing temperature, the result will be a vesiculation or fluffing of the material in such receptacle, as more specifically described and claimed in the acknowledged application.

It will be understood that an indefinite number of groups of the tubes can be provided, but the last passage of the liquid under treatment should be made in a descending tube. The apparatus in question may consist of a single serpentine tube in lieu of tubes connected to chambers. By serpentine is meant an assembly of several tubes so connected that a continuous passage of liquid through the same may be effected, and it is evident in practice that it will be possible to employ as many serpentines in the shell as the power of evaporation required by the apparatus demands.

Ordinarily, the apparatus should not work under vacuum, since this prevents the attainment of the temperature desired and the pressure should be at least sufficient to allow the vapor to escape to the atmosphere. Otherwise the temperature would be too low and the extract could not cool. In many cases it may be desirable to give a back pressure to the exhaust to raise the pressure and thereby the temperature in the apparatus. However, when I wish to utilize exhaust steam in making the concentration, it may become necessary to work the apparatus under a slight vacuum to make the concentration at a temperature slightly below 100° C. When working under pressure it is necessary to use a pump to force the material to be treated into the apparatus; under other conditions, however, this pump may be replaced by any appropriate apparatus for feeding the liquid into the tubes, and in some instances a gravity feed may be employed.

By the use of this process I have succeeded in concentrating wool washings and wood pulp washings so as to obtain hard extracts, and I have also concentrated molasses and sugar juices obtained from different sources and secured solid products on cooling.

I claim:

1. The process of concentrating viscous liquids, which comprises evaporating at a relatively low temperature until such liquids assume a thick and concentrated consistency, and then rapidly passing such concentrated liquid through a zone of materially higher temperature and evaporating the same in transit.

2. The process of concentrating viscous liquids, which comprises evaporating at a relatively low temperature until such liquids assume a thick and concentrated consistency, then rapidly passing such concentrated liquid through a zone of materially higher temperature for evaporation in transit, and discharging said liquid in a downward direction.

3. The process of desiccating thick liquids, which comprises rapidly passing a traveling film of such liquid through a zone of relatively high temperature, the temperature and the time of passage being so correlated that a sufficient amount of the moisture present is evaporated, prior to injurious changes occurring, to allow the liquid to solidify upon cooling, and cooling the treated liquid to a solidified mass.

4. The process of desiccating thick liquids, which comprises rapidly passing a traveling film of such liquid through a zone of relatively high temperature and pressure, the temperature and the time of passage being so correlated that a sufficient amount of the moisture present is evaporated, prior to injurious changes occurring, to allow the liquid to solidify upon cooling, and cooling the treated liquid to a solidified mass.

5. The process of desiccating thick liquids, which comprises rapidly passing a traveling film of such liquid through a zone of relatively high temperature and pressure, the temperature and the time of passage being so correlated that a sufficient amount of the moisture present is evaporated prior to injurious changes occurring to allow the liquid to solidify upon cooling, and releasing the pressure under circumstances permitting the treated liquid to solidify.

6. The process of desiccating thick liquids, which comprises rapidly passing such liquid as a traveling film up a vertical steam-heated tube and then down through a similar tube, both passages being made at a relatively high temperature and the time of passage and the temperatures within the tubes being so correlated that a sufficient amount of the moisture present is evaporated, prior to injurious changes occurring to allow the liquid to solidify upon cooling, discharging the liquid, and allowing such removed liquid to set to a solid mass.

7. The process of desiccating thick liquids, which comprises rapidly passing such liquid as a traveling film up a vertical steam-heated tube and then down through a similar tube, both passages being made at a relatively high temperature and the time of passage and the temperatures within the tubes being so correlated that a sufficient amount of the moisture present is evaporated prior to injurious changes occurring to allow the liquid to solidify upon cooling, discontinuing the passage and removing the treated liquid upon the removal of this amount of moisture, and allowing such removed liquid to set to a solid mass.

8. In the concentration and desiccation of liquids, the process which comprises concentrating a liquid to a thick consistency, transmitting the thickened liquid as a rapidly traveling film through a zone of relatively high temperature and pressure, the temperature and time of passage being so correlated that a sufficient amount of the moisture still present is removed, prior to injurious changes occurring, to allow the treated liquid to set upon cooling, and cooling the liquid under circumstances permitting its setting to a solidified mass.

9. In the concentration and desiccation of liquids, the process which comprises concentrating a liquid to a thick consistency, transmitting the thickened liquid as a rapidly traveling film through a plurality of vertically arranged heated tubes, the passage through the last of said tubes being in a downward direction and said tubes being maintained at relatively high temperatures, the temperatures and time of passage being so correlated that a sufficient amount of the moisture still present is removed prior to injurious changes occurring to allow the treated liquid to set upon cooling, and cooling the liquid under circumstances permitting its setting to a solidified mass.

10. In the concentration and desiccation of liquids, the process which comprises concentrating a liquid to a thick consistency, transmitting the thickened liquid as a rapidly traveling film through a zone of relatively high temperature and pressure, the temperature and time of passage being so correlated that a sufficient amount of the moisture still present is removed prior to injurious changes occurring to allow the treated liquid to set upon cooling, and discharging the treated liquid at atmospheric pressure.

11. In the concentration and desiccation of liquids, the process which comprises concentrating a liquid to a thick consistency, transmitting the thickened liquid as a rapidly traveling film through a zone of relatively high temperature and pressure, the temperature and time of passage being so correlated that a sufficient amount of the moisture still present is removed prior to injurious changes occurring to allow the treated liquid to set upon cooling, and discharging the treated liquid at atmospheric pressure through a chamber maintained at an intermediate pressure.

In testimony whereof, I have signed my name to this specification, in the presence of two subscribing witnesses.

PAUL KESTNER.

Witnesses:
  HENRI CHARRIER,
  LÉON PECKEL.